Feb. 13, 1962         H. H. J. PAULINI         3,020,659
CANDY OR PILL DISPENSING CONTAINER
Filed April 25, 1957         2 Sheets-Sheet 1
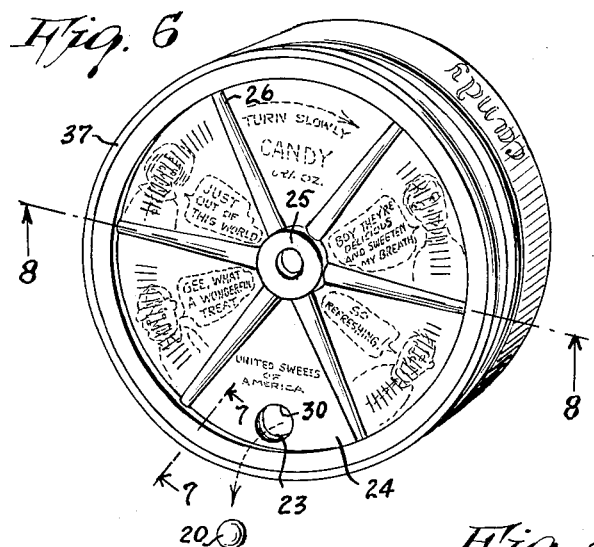
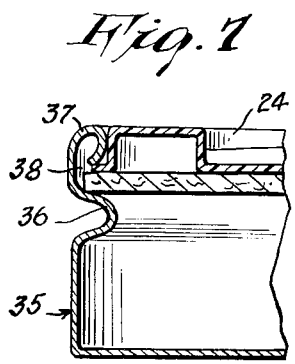
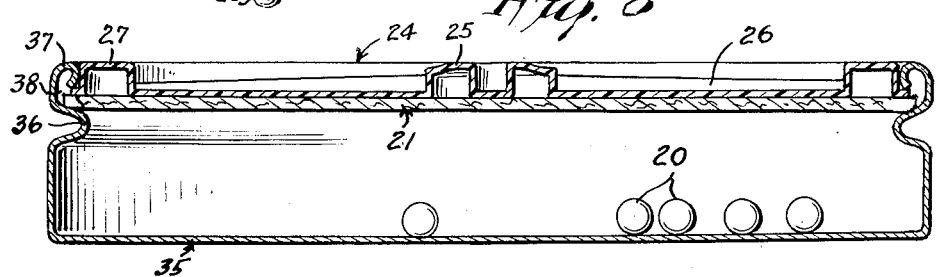
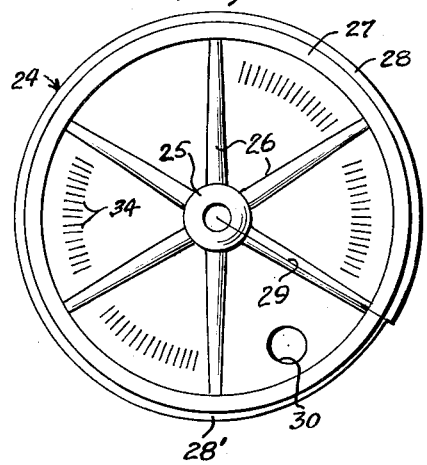
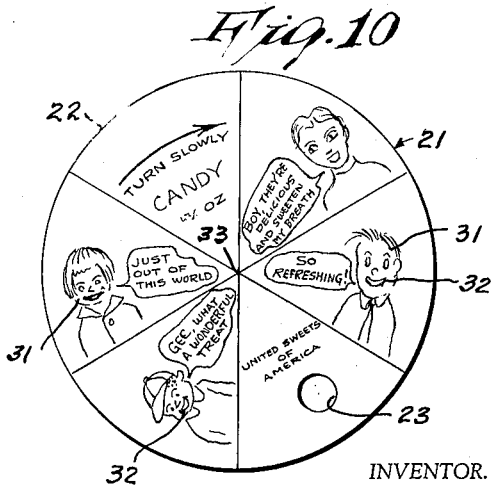
INVENTOR.
HARRY H. J. PAULINI
BY
L. S. Saulsbury
ATTORNEY Feb. 13, 1962 H. H. J. PAULINI 3,020,659
CANDY OR PILL DISPENSING CONTAINER
Filed April 25, 1957 2 Sheets-Sheet 2
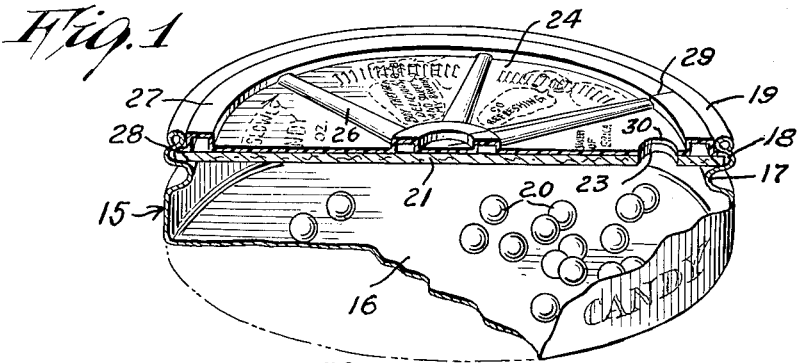
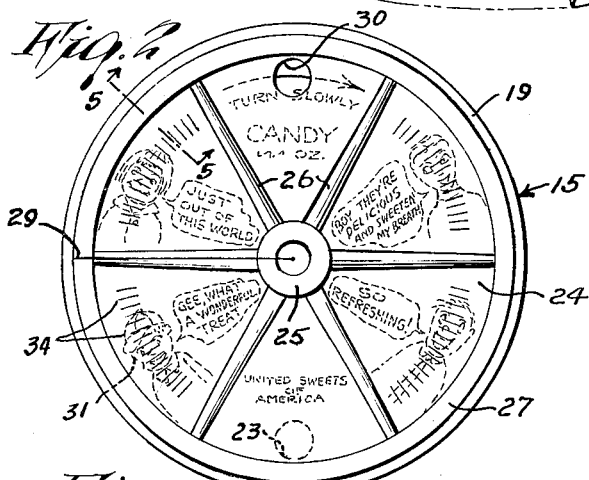
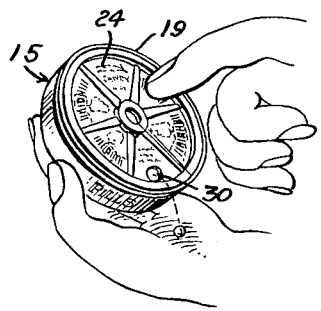
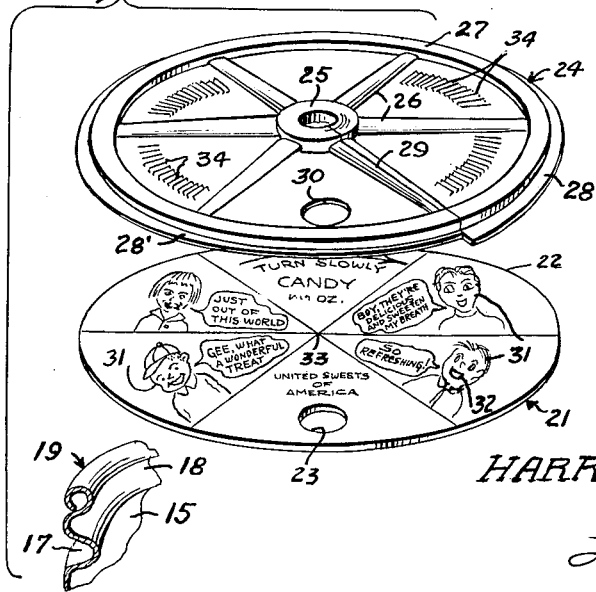
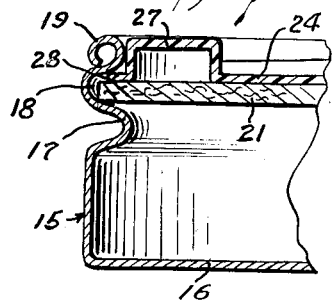
INVENTOR.
HARRY H. J. PAULINI
BY
L. S. Saulsbury
ATTORNEY United States Patent Office 3,020,659
Patented Feb. 13, 1962

3,020,659
CANDY OR PILL DISPENSING CONTAINER
Harry H. J. Paulini, New York, N.Y., assignor, by direct and mesne assignments, to United Sweets of America, Inc.
Filed Apr. 25, 1957, Ser. No. 655,100
2 Claims. (Cl. 40—307)

This invention relates to a candy or pill dispensing container.

It is the principal object of the present invention to provide a handy and practical light weight pocket size candy or pill dispensing container.

It is another object of the invention to provide a candy dispensing container that serves as a toy.

It is still another object of the invention to provide a candy or pill dispensing container having non-releasable closure parts with openings therein in which one closure part can be easily and quickly turned upon the other closure part to bring the openings either into or out of registry with one another so as to dispense the candy piece or pill or to close the container.

It is a further object of the invention to provide a candy or pill dispensing container in which non-releasable closure parts thereof may be readily and quickly assembled in simple manner upon the container body over the contents to close the container.

It is a still further object of the invention to provide in a candy or pill dispensing container a device whereby an illustration becomes animated when the movable closure part is turned upon the stationary part to dispense the candy or pill.

Still further objects of the invention are to provide a candy and pill dispensing container, having the above objects in mind, which is of simple construction, inexpensive to manufacture, has a minimum number of parts, formed by simple die stamping operations, compact, of pleasing appearance, efficient and effective in use.

For a better understanding of the invention, reference may be had to the following detailed description taken in connection with the accompanying drawing, in which FIGURE 1 is a perspective view of the candy piece or dispensing container constructed according to one form of the invention, portions being broken away to show the interior construction thereof, FIG. 2 is a top plan view of the candy piece or pill dispensing container shown in FIG. 1, FIG. 3 is a collective perspective view of the container closure parts and of a fragment of the container body, FIG. 4 is a perspective view with illustration made as to the manner in which the closure part is turned to dispense the candy piece or pill, FIG. 5 is an enlarged fragmentary sectional view of the container taken on line 5—5 of FIG. 2, FIG. 6 is a perspective view of a modified form of the invention with the dispensing container uprighted with a candy piece or pill being dispensed therefrom, FIG. 7 is an enlarged fragmentary sectional view of the container as viewed on line 7—7 of FIG. 6, FIG. 8 is a full enlarged vertical sectional view of the container as viewed on line 8—8 of FIG. 6, FIG. 9 is a top plan view of the outer closure part used in both forms of the invention, and FIG. 10 is a top plan view of the inner closure part used in both forms of the invention.

Referring now particularly to FIGS. 1 to 5, 15 represents a container body formed of thin sheet metal which has a bottom 16, a peripheral indentation 17, an internal groove 18 and an outwardly rolled over edge 19. The container may be filled up to the indentation 17 with candy pieces or pills 20.

This inner disk 21 has a peripheral edge 22 and a dispensing opening 23. This disk is forced downwardly through the opening provided by the rolled over edge 19 and into the internal groove 18. This disk 21 is formed of compressible stiff paper or cardboard, the surface of which is sufficiently rough to give frictional contact with the groove surface so that it will not readily slide in the groove 18. The edge of the disk as it is inserted in the groove may be upset or expanded sufficiently and tend to fill the groove with the edge material and provide additional frictional contacting area for engagement of the disk with the surface of the groove. This disk 21 thus has sufficient frictional engagement with the groove to prevent its rotation therein.

Also fitted into the groove 18 over the cardboard disk 21 is an outer disk 24. This outer disk 24 is formed of acetate or plastic sheet material and is embossed to provide a formation simulating a wheel having a hub 25 outwardly from which spokes 26 extend and a rim 27. Extending outwardly from the rim 27 is a flange 28 adapted to fit into the groove 18 and underlie the rolled over edge 19. This flange 28 is narrow and of short radial width and only the upper corner of its peripheral edge is in engagement with the upper wall of the groove 18. This disk 24 being of transparent acetate sheet has a mirror-like smoothness and is non-compressible as compared to the paper or cardboard disk 21.

Since the disk 24 is not compressible provision has to be made to effect the easy insertion of its peripheral edge under the rolled edge 19 and into the groove 18. In order to effect this the disk is cut radially outwardly from its center as at 29 and the flange 28 is relieved or gradiently narrowed through about ninety degrees of its extent up to the radial cut 29.

To insert the wheel disk 24 within the groove 18 the portion of the disk lying on the side of the cut 29 having the narrow flange portion 28' is lifted above the portion of the disk at the opposite side of the cut 29 and the flange 28 is inserted under the rolled edge 19 and over the cardboard disk 21 for engagement with the upper side of the groove 18. Thereafter, the portion having the narrow flange area 28' is snapped into place under the rolled edge 19 and within the groove 18.

Since the outer disk 24 is of acetate and has a smoother surface than the cardboard disk 21 there is little friction therebetween and the outer disk can thus be turned without turning the inner disk. The wheel disk 24 has a dispensing opening 30 which can be registered with the opening 23 of the fixed disk 21. This is effected by turning the disk 24 with the finger in the manner illustrated in FIG. 4. The candy piece or pill can then be dispensed through the openings. After the candy piece or pill has been so discharged the wheel disk 24 can be again turned either forwardly or rearwardly to close the opening 23 in the fixed inner disk.

On the inner disk 21 are a series of face illustrations 31 having respectively open mouths 32. All of open mouths have the same radial distance from a center 33 of the disk 21. On the wheel disk 24 which is transparent and between certain of the spokes 26 are series of arcuately arranged and radially-extending embossments, undulations or markings 34 respectively arcuately spaced from one another equivalent to the height of the open mouth 32 of each face illustration 31. These embossments, undulations or markings will when vertically aligned with mouth openings blot out the mouth while the spaces between the embossments or markings will allow the mouth to be visualized. If the disk 24 is turned quickly a moving picture effect will be had that will give to the face illustration the appearance of talking. The lips will appear to be opening and closing. Legends associated with each face can be read directly through the transparent top sheet 24 to indicate what the moving mouths may be saying. This is an amusement feature which, of course, will help to popularlize and sell the goods that are offered for sale in these containers. It thus provides a built-in toy feature. The container thus serves as a toy as well as a candy container.

Referring particularly to FIGS. 6, 7 and 8, there is shown a construction in which a container body 35 has a peripheral indentation 36 and an inwardly-turned top edge 37 providing for an annular space 38 therebetween. The other parts are common with the above described first form of the invention. The two disks 21 and 24 are the same. The assembling of the parts after filling the container body with the candy pieces or pills is the same as above described. The inner disk 21 is inserted by applying pressure to force the peripheral edge into the annular space 38 under the inturned edge 37.

It should now be apparent that there has been provided a simple and inexpensive candy or pill dispensing container which can be easily filled and the closure parts quickly and easily assembled thereon.

It will be apparent that the inner disk 21 is held against rotation within the annular groove 18 or space 38 and that the outer disk is connected over the inner disk and to the container body 15 within the annular groove or space so that it can be easily turned over the inner disk to register its hole 30 with the hole 23 of the inner disk without the inner disk being turned.

While various changes may be made in the detailed construction, it shall be understood that such changes shall be within the spirit and scope of the present invention as defined by the appended claims.

What is claimed is:

1. In a candy or pill dispensing container having a cylindrical open ended container body with an annular internal groove, and inner and outer closure disks fitted into said groove so that the inner disk is retained against rotation while the outer disk may be rotated relative thereto, the inner disk having an illustration thereon suitable for animation, and the outer disk being transparent and having an arcuate series of embossments, undulations or markings suitably spaced from one another and adapted when the outer disk is rotated to pass over the illustration so as to animate the same.

2. In a candy or pill dispensing container as set forth in claim 1, having a further embossments on the outer disk simulating a wheel including a hub and spokes passing radially outwardly beyond the series of embossment and serving to facilitate the rotation of the outer disk by the finger.

References Cited in the file of this patent
UNITED STATES PATENTS

| | | |
|---|---|---|
| 1,300,222 | Moore | Apr. 8, 1919 |
| 1,534,803 | Moore | Apr. 21, 1925 |
| 1,678,722 | Carlson | July 31, 1928 |
| 1,764,352 | Sacerdote | June 17, 1930 |
| 1,896,976 | Schifferdecker | Feb. 7, 1933 |
| 2,085,414 | Cavanagh | June 28, 1937 |
| 2,093,149 | Lee | Sept. 14, 1937 |
| 2,136,795 | Hoffman | Nov. 15, 1938 |
| 2,171,675 | Travnitschek | Sept. 5, 1939 |
| 2,275,293 | Foley | Mar. 3, 1942 |
| 2,426,883 | Kartyshai | Sept. 2, 1947 |
| 2,526,308 | Vorsanger | Oct. 17, 1950 |
| 2,771,694 | Laughton | Nov. 27, 1956 |
| 2,808,150 | Schlesser | Oct. 1, 1957 |
| 2,832,514 | O'Connor | Apr. 29, 1958 |